United States Patent Office 3,560,580
Patented Feb. 2, 1971

3,560,580
PREPARATION OF BROMINATED STYRENE
George A. Burk, Bay City, Mich., assignor to The Dow Chemical Company, Midland, Mich., a corporation of Delaware
No Drawing. Filed Jan. 2, 1969, Ser. No. 788,612
Int. Cl. C07c 25/04, 25/28
U.S. Cl. 260—650                                    7 Claims

ABSTRACT OF THE DISCLOSURE

Ring-brominated styrenes are prepared by passing a mixture of ethylbromobenzene and bromine through a heated zone at a temperature between 600° and 700° C. to produce ring-brominated styrenes in good yield.

---

This invention relates to the preparation of bromostyrene, and more particularly relates to the preparation of bromostyrene from ethylbromobenzene.

Various methods have been employed to produce ring-brominated styrenes and are set forth in U.S. Letters Pat. 2,443,217 and British Pat. 986,634. Oftentimes in catalytic dehydrogenation, considerable amounts of tar are generated. Such tar and carbonaceous deposits substantially reduce the desirability of a process and are undesirable particularly where continuous operation is required.

It would be desirable if there were available a relatively simple and direct process for the conversion of ethylbromobenzene to bromostyrene.

The present invention produces ring-brominated styrenes by heating ethylbromobenzene vapor in the presence of bromine in about a 1:1 mole ratio at a temperature of 600° to 700° C. for a period of time less than ten seconds to provide the desired ring-brominated styrene. More specifically, ethylbromobenzenes containing 1 to 5 bromine atoms on the benzene ring are heated to a temperature of 600° to 700° C., and beneficially at a temperature of about 650° C., for a period of from about 0.25 second to about 2 seconds wherein bromine and ring-brominated ethylbenzene are present in a mole ratio of from about 1.3:1 to about 1:1, and beneficially in a ratio of about 1.1:1 to 1:1. Advantageously, a carrier gas is employed. Such a carrier gas may be inert or reactive to a minor degree with suitable carrier gases such as steam, nitrogen, helium, argon and the like. Advantageously, the carrier gas may be present in a portion of from about 0.5 to 5 times the number of moles of ethylbromobenzene.

The method of the present invention is readily carried out in any one of a wide variety of reactors including packed tubular reactors, unpacked tubes and the like. Any conventional equipment capable of heating vapors to the desired temperature is suitable provided it is not attacked by the reactants or reaction products. The reactants may be passed to a reaction zone as individual preheated streams either in a carrier gas or fed into a preheated carrier gas. The reactants and carrier gas may be passed to a heated reactor as a mixture where they are raised to the desired temperature. The manner of feed to the reactor is not critical, provided the desired residence time is obtained for the reaction mixture in a reaction zone. The reaction mixture emerging from the heated eractor desirably is quenched to a temperature below about 50° C., or at least the bromostyrene portion contacted with suitable polymerization inhibitor such as t-butylcatechol. The recovered reaction product is purified by distillation or other separation process in a manner well known to the art.

In supplying the bromine and brominated ethylbenzene to the reactor, conditions must be maintained which discourage or prevent the reaction of the bromine with the α-hydrogens in ethylbromobenzene and prevent disubstitution. If the bromine and ethylbromobenzene are admixed prior to introduction into the reactor, beneficially they are maintained at a temperature below about 0° C., and advantageously, below about −10° C. in the absence of light or other catalytic agent which would tend to provoke disubstitution in the alpha position.

Advantageously in the method of the present invention, 90 percent to 95 percent of the bromine is readily recovered in the form of hydrogen bromide which can be converted to bromine and subsequently recycled. Generally when steam is employed as a carrier gas, it is desirable to maintain a minimal quantity of steam to reduce a minor tendency to produce bromophenylacetylenes which can present difficulty in isolating the desired bromostyrene product.

The method of the present invention is useful for the conversion of all ring-brominated ethylbenzenes to the corresponding ring-brominated styrenes and is used with benefit in the preparation of o-, m- and p-bromostyrenes; 2,3-, 2,4-, 2,5-, and 3,4-dibromostyrenes; 2,3,4-tribromostyrene: 2,4,5-tribromostyrene; 2,3,5,6-tetrabromostyrene; 2,3,4,5 - tetrabromostyrene and 2,3,4,5,6 - pentabromostyrene.

The following examples illustrate the manner in which the principles of the invention are applied but are not to be construed as limiting the scope of the invention.

EXAMPLE 1

A 20 inch long reactor comprising a ¾ inch diameter tube of high silica content glass (commercially available under the trade designation of "Vycor") is positioned within a 12 inch electric furnace and the central portion of the tubular reactor within the furnace is provided with a packing 10 inches in length of ¼ inch diameter high silica glass rings (Vycor). The reactor is mounted vertically. The upper opening of the reactor is provided with a carrier gas input and a reactant input. Needle valves are disposed in each of the inputs to control the rate of addition to the reactor. The outlet of the reactor is connected to a liquid absorbent and cooler. An equimolar mixture of bromine and mixed isomers of ring-brominated ethyldibromobenzene is prepared and maintained at a temperature of −10° C. The packed portion of the reactor is heated to a temperature of 650° C. The reactants are added to the reactor with a flow of nitrogen gas. The molar proportion of nitrogen to ethyldibromobenzene is about 1.2 and total contact time is about 1.28 seconds. The reactants are cooled in a dilute potassium hydroxide solution immediately on leaving the reactor. Analysis of the potassium hydroxide indicates a recovery of 92 percent of the bromine added. The organic layer is separated by the potassium hydroxide solution and analyzed by gas chromatography. The result of the analysis are as follows:

12.0% unchanged ar-ethyldibromobenzenes,
75.9% isomers of ar-dibromostyrenes,
3.2% unidentified,
5.2% α-bromoethyl-dibromobenzene,
3.6% α-bromo-ar-dibromostyrene,
    trace of tribromostyrene.

The dibromostyrenes are separated by fractional distillation.

EXAMPLE 2

The procedure of Example 1 is repeated with the exception than the mole ratio of nitrogen to ethyldibromobenzene is 0.5 and the contact time is 1.4 seconds. 93.5 percent of the bromine is recovered as hydrogen bromide and the crude product is analyzed by gas chromatography with the following results:

11.1% ar-ethyldibromobenzene,
78.1% dibromostyrene,
8.1% unknown,
0.8% α-bromoethyldibromobenzene,
1.2% α-bromo-ar-dibromostyrene.

The dibromostyrenes are separated by fractional distillation.

EXAMPLE 3

The apparatus and general procedure of Example 1 are employed wherein the mole ratio of bromine to ethyldibromobenzene is 1.25 and the feed solution is maintained at a temperature of −30° C. The reactor is heated to a temperature of 660° C. and 1.2 moles of nitrogen are employed per mole of ethyldibromobenzene. The contact time in the heated reactor is 1.2 seconds. Ninety-six percent recovery of crude product is obtained. Analysis of the crude product by gas chromatography indicates 2.0% ar-ethyldibromobenzene
69.9% ar-dibromostyrene
17.0% α-bromo-ar-dibromoethylbenzene
3.2% α-bromo-ar-dibromostyrene The dibromostyrenes are separated by fractional distillation.

EXAMPLE 4

Employing the apparatus and general procedure of Example 1, the reactor temperature is 630° C., the rate of nitrogen flow is 0.5 mole per mole of ar-ethyldibromobenzene and steam in a proportion of 1.3 moles per mole of ar-ethyldibromobenzene. The reactants are mixed in a ratio of one mole of bromine to 1.25 moles of ethyldibromobenzene. The feed solution is maintained at a temperature of −25° C. and passed through the packed bed to provide a contact time of 1.2 seconds. Ninety-nine percent crude product is recovered and 92 percent of the added bromine is recovered as hydrogen bromide. Gas chromatographic analysis of the crude product gives the following results:

3.6% ar-ethyldibromobenzene,
86.2% ar-dibromostyrenes,
4.8% α-bromo-ar-dibromoethylbenzene,
2.0% α-bromo-ar-dibromostyrene.

The dibromostyrenes are separated by fractional distillation.

EXAMPLE 5

Employing the apparatus and general procedure of Example 1 and a furnace temperature of 630° C., the feed solution contains one mole of ethyldibromobenzene and 1.05 moles of bromine maintained at a temperature of −25° C., nitrogen flow ratio of 0.5 mole per mole of ethyldibromobenzene and a steam flow ratio of 2.3 is maintained. These conditions provide a contact time of 1.1 seconds. Ninety percent of the added product is recovered as hydrogen bromide. Ninety-four percent crude product is recovered and analyzed by gas chromatography with the following results:

5.7% ar-ethyldibromobenzene,
91.9% ar-dibromostyrenes,
0.5% α-bromoethyldibromobenzene,
0.5% α-bromo-ar-dibromostyrene.

The ar-dibromostyrenes are separated by fractional distillation.

EXAMPLE 6

Employing the apparatus and general procedure of Example 1, a mixture of 2,4- and 2,5-dibromoethylbenzene is mixed with an equimolar proportion of bromine and maintained at −20° C. One half mole of nitrogen per mole of dibromoethylbenzene is employed as a carrier gas. The bed temperature is maintained at 600° C. Chromatographic analysis of the product indicates 3.5% dibromoethylbenzene (2,4- and 2,5-),
82.2% dibromostyrene,
14.5% α-bromoethyl 2,4- and 2,5-dibromoethylbenzene.

The ar-dibromostyrene is separated by fractional distillation.

EXAMPLE 7

The glass reaction tube of Example 1 is replaced with a ¾ inch diameter nickel tube. An equimolar mixture of bromine and 3-4-dibromethylbenzene is prepared and maintained at a temperature of −15° C. The reactants are added to the bed with nitrogen wherein 1.3 moles of nitrogen are employed per mole of dibromoethylbenzene to provide a contact time of 1.2 seconds. Seventy-five percent of the bromine added is recovered as hydrogen bromide. Crude product recovery is about 100 percent based on dibromoethylbenzene. Analysis of the crude product by nuclear magnetic resonance, infrared spectroscopy and gas chromatography gives the following results:

| | (In percent) | | |
| --- | --- | --- | --- |
| | NMR | IR | GC |
| 3,4-dibromoethylbenzene | 31 | 40 | 36.6 |
| 3,4-dibromostyrene | 43 | 35 | 43.2 |
| Tribromostyrene | 23 | Balance | 20.2 |

The 3,4-dibromostyrene is separated by fractional distillation.

In a manner similar to the foregoing illustrations, the hereinbefore delineated ring-brominated ethylbenzenes are converted to corresponding bromostyrenes.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A process for the catalytic conversion of ring-brominated ethylbenzenes to a corresponding ring-brominated styrene, the method comprising
    heating an ethylbromobenzene containing 1 to 5 bromine atoms in the benzene ring to a temperature of from about 600° to 700° C. for a period of from about 0.25 second to about 2 seconds in the presence of bromine wherein the bromine and said ethyl bromobenzene are present in a mole ratio of from about 1.3:1 to about 1:1, and
    cooling the resultant mixture.

2. The method of claim 1 wherein a carrier gas is employed.

3. The method of claim 2 wherein the carrier gas is present in a proportion of from about 0.5 to 5 times the number of moles of ethylbromobenzene.

4. The method of claim 1 wherein the carrier gas is nitrogen.

5. The method of claim 1 wherein the temperature is about 650° C.

6. The method of claim 1 wherein the mole ratio of bromine to ethylbromobenzene is from about 1.1:1 to about 1:1.

7. The method of claim 1 including the step of separating a ring-brominated styrene therefrom.

References Cited

UNITED STATES PATENTS 2,443,217   6/1948   Amos et al. _____ 260—650UX

FOREIGN PATENTS 986,634   3/1965   Great Britain _____ 260—650

HOWARD T. MARS, Primary Examiner

U.S. Cl. X.R.

260—651